United States Patent [19]

Price, Jr. et al.

[11] Patent Number: 5,373,402
[45] Date of Patent: Dec. 13, 1994

[54] SYSTEM AND METHOD FOR WRITING SERVO INFORMATION AND DATA TO A PLURALITY OF MAGNETIC DISCS

[75] Inventors: John J. Price, Jr., Edina; Tuan V. Ngo, Eden Prairie, both of Minn.

[73] Assignee: VTC Inc., Bloomington, Minn.

[21] Appl. No.: 110,366

[22] Filed: Aug. 23, 1993

[51] Int. Cl.$^5$ .................. G11B 15/12; G11B 5/596
[52] U.S. Cl. .................................. 360/61; 360/77.05
[58] Field of Search .............. 360/61, 84, 46, 33.1, 360/75, 77.05; 369/47; 324/212

[56] References Cited

U.S. PATENT DOCUMENTS

| | | | |
|---|---|---|---|
| 4,912,576 | 3/1990 | Janz | 360/77.08 X |
| 4,967,292 | 10/1990 | Moteki | 360/61 X |
| 4,969,056 | 11/1990 | Negishi et al. | 360/66 |
| 5,053,897 | 10/1991 | Ikeshita | 360/61 X |
| 5,132,852 | 7/1992 | Price | 360/68 X |
| 5,241,435 | 8/1993 | Saito et al. | 360/61 X |

Primary Examiner—Donald Hajec
Assistant Examiner—Patrick Wamsley
Attorney, Agent, or Firm—Kinney & Lange

[57] ABSTRACT

A system for writing servo information to a plurality of magnetic discs in a servo write mode, and for writing data to the plurality of magnetic discs in a data write mode in disclosed. The system includes a servo binary input buffer for receiving a mode signal and for directing the write signal based upon the mode signal. A first plurality of switches, coupled to the servo binary input buffer and to a disc select buffer, directs the write signal to a selected portion of a plurality of write heads. A second plurality of switches, coupled to the first plurality of switches, to the plurality of write heads, and to a head select buffer, supplies the write signal to one write head in the selected portion of the plurality of write heads during the data write mode, and supplies the write signal to one half of the write heads in the selected portion of the plurality of write heads during the servo write mode.

16 Claims, 3 Drawing Sheets

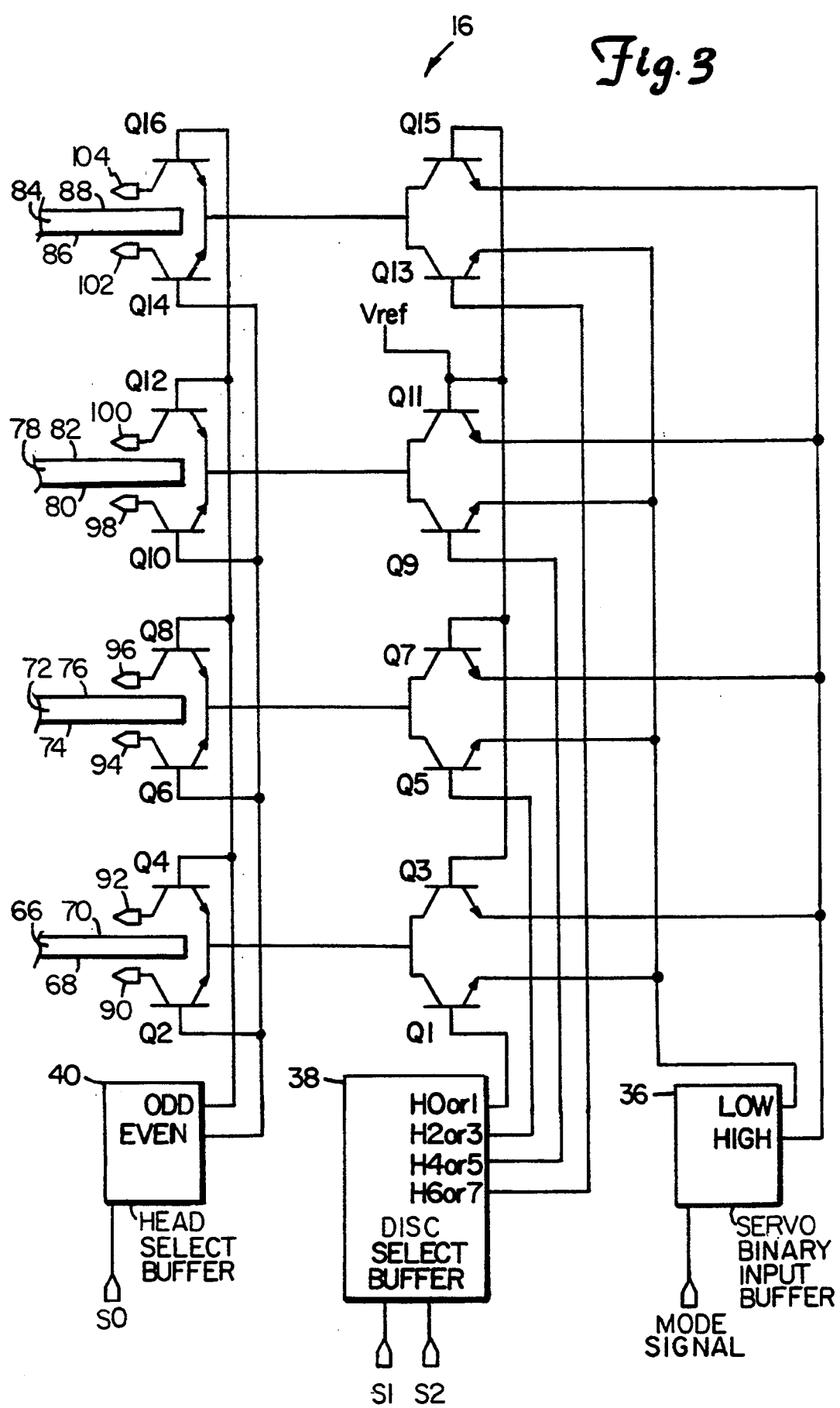

SYSTEM AND METHOD FOR WRITING SERVO INFORMATION AND DATA TO A PLURALITY OF MAGNETIC DISCS

BACKGROUND OF THE INVENTION

The present invention relates to the hard disc drive industry, and in particular to read/write preamplifiers having the capability of simultaneously writing servo information to multiple heads.

A read/write inductive disc drive head in a hard disc drive performs two specific functions. First, the head accepts a magnetic transmission signal from the disc drive and writes the signal to a magnetic disc medium during a write mode. This function requires large currents and voltages (approximately 40 milliamperes per head at 5 volts). Second, the disc drive head reads magnetic transmission signals from the disc during a read mode, requiring relatively small voltages and currents.

Properly positioning a disc drive head over a specific magnetic data track on a disc is critical for high performance of the system. An important function of the disc drive during either a read or write application is the extraction of a position error signal, which indicates that the head is incorrectly positioned over a desired magnetic-data track. An incorrectly positioned head can result in magnetic signals or information being erroneously written to or read from the disc.

A recent development in the hard disc drive industry is the concept of servo fields. Servo fields, also called servo information or servo bursts, are pre-written patterned feedback information positioned at particular sections of a disc. Servo fields are examined and utilized to determine whether a disc drive head is accurately positioned over a desired magnetic data track. If the head is not properly positioned over a desired track, the servo fields provide a feedback signal which keeps the head on track during a read or write application.

During a read or write application, a position error signal may develop indicating that the head is incorrectly positioned over a desired magnetic-data track. The position error signal is proportional to the deviation of the head from the center of the desired magnetic data track. The servo fields recognize the position error of the head and apply electromechanical negative feedback to the head to force the head position to the center of the desired track. This feedback control loop is one of the key features of a Winchester disc drive since the track-following servo fields allow the head to be correctly positioned independent of such mechanical problems as vibration, bearing rattle and wobble, mechanical "backlash" and "runout," non-circularity of the track, thermal expansion, and wear. In addition, it makes the precision requirements of mechanical components within the disc drive much less rigorous and generally results in a cheaper, denser storage unit.

In contrast to hard discs, servo fields are not necessary when using a floppy disc and a floppy disc drive because of the low density of floppy discs. A floppy disc has a relatively low number of tracks per disc, as compared to a hard disc; therefore, a disc drive head can be accurately positioned over a given magnetic data track without the use of servo fields or electromechanical negative feedback. However, hard discs have a much greater density than floppy discs. This high density is achieved by placing the magnetic data tracks of a hard disc substantially closer together than the data tracks of a floppy disc. This high density necessitates the need for a feedback system, i.e., servo fields, to determine whether the disc drive head is accurately positioned over a desired magnetic data track.

Since the inception of servo fields, hard disc drive manufacturers would pre-write the necessary servo fields to one surface of one disc at a time. The servo fields would first be written to one surface of the disc, and then written to the other surface of the disc. This procedure is repeated for virtually every hard disc presently being manufactured and is extremely time consuming. Disc drive manufactures have found that the additional procedure of writing servo fields to their magnetic discs in addition to writing standard data information to the magnetic discs greatly inhibits the disc manufacturing process. However, writing servo fields and data information to too many disc surfaces at one time dissipates too much power and causes the integrated circuits within the disc drive heads to overheat and fail.

Therefore, there is a need for a system which has the capability of simultaneously writing servo information to a plurality of magnetic discs in a servo write mode, and for writing data to the plurality of magnetic discs in a data write mode.

SUMMARY OF THE INVENTION

The present invention is a system for writing servo information to a plurality of magnetic discs in a servo write mode, and for writing data to the plurality of magnetic discs in a data write mode. The system includes a servo binary input buffer for receiving a mode signal and for directing a write signal based upon the mode signal. A first plurality of switches, coupled to the servo binary input buffer and to a disc select buffer directs the write signal to a selected portion of the plurality of write heads. A second plurality of switches, coupled to the first plurality of switches, to the plurality of write heads, and to a head select buffer, supplies the write signal to one write head in the selected portion of the plurality of write heads during a data write mode, and supplies the write signal to one half of the write heads in the selected portion of the plurality of write heads during the servo write mode, based upon a binary input signal. Each of the plurality of switches includes at least one transistor.

BRIEF DESCRIPTION OF THE DRAWINGS

FIG. 3 is a detailed circuit diagram further illustrating the portion of the write circuitry of the read/write preamplifier shown in FIG. 2.

DETAILED DESCRIPTION OF THE PREFERRED EMBODIMENTS

Figure 1:
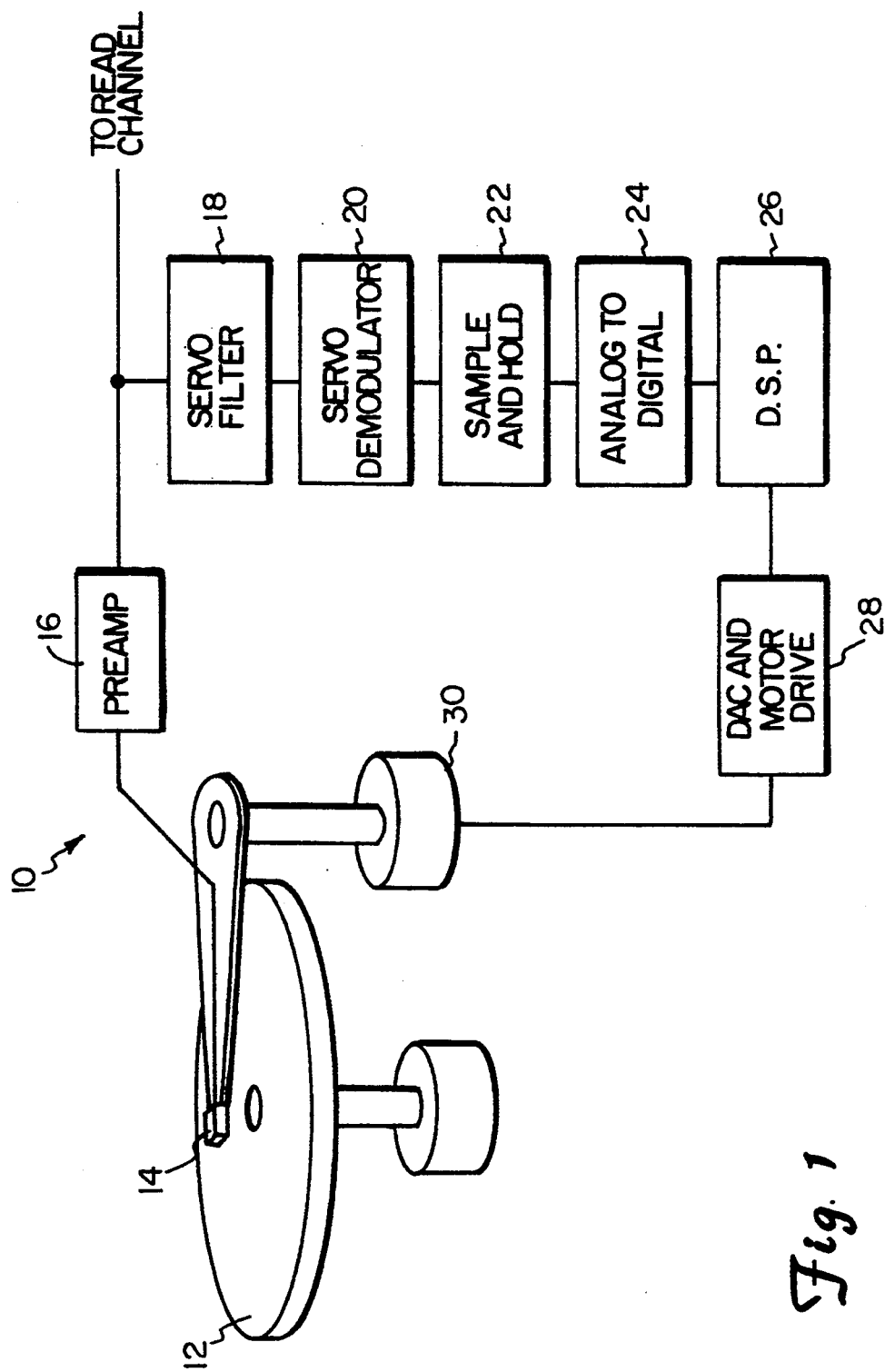
FIG. 1 is a block diagram of a servo loop system in a magnetic disc drive.

FIG. 1 is a block diagram of "embedded" servo loop system 10. As shown in FIG. 1, servo loop system 10 includes magnetic disc 12, disc drive head 14, read/write preamp 16, servo filter 18, servo demodulator 20, sample and hold 22, analog-to-digital converter 24, digital signal processing chip 26, digital-to-analog converter and motor drive 28, and actuator 30.

In embedded servo loop system 10, the normal magnetic data patterns or sectors of disc 12 are interrupted at intervals to put in special servo fields, also known as servo information or servo bursts. Servo loop system 10 is called an "embedded" servo loop system because the servo information, which provides a feedback signal to keep disc drive head 14 on track during a read or write application, is "embedded" into the data and comes out through the usual read channel.

Disc drive head 14 picks up magnetic flux from data written on disc 12, which is then amplified by read/write preamplifier 16. At this point, the magnetic flux signal goes to servo filter 18, which filters out any unwanted noise associated with the signal, and to the read channel. After proper filtering via servo filter 18, the signal is fed into servo demodulator 20 which produces an electrical signal proportional to the deviation of the head from the center of the data track. The output of servo demodulator 20 consists of several signal amplitudes which must be subtracted and normalized by sample and hold 22 to produce the actual position error signal needed by servo loop system 10.

In typical current practices, the position error signals will be digitized by analog-to-digital converter 24 to about eight to nine bit accuracy and then fed to digital signal processing chip 26. Digital signal processing chip 26 compares the measured position of head 14 with the expected position of head 14 and gives corresponding detailed control strategy to digital-to-analog converter and motor drive 28 which drives head arm actuator 30 through suitable power circuitry. The control algorithm embodied in digital signal processing chip 26 implements the detailed control strategy, including filtering and time constraints.

Figure 2:
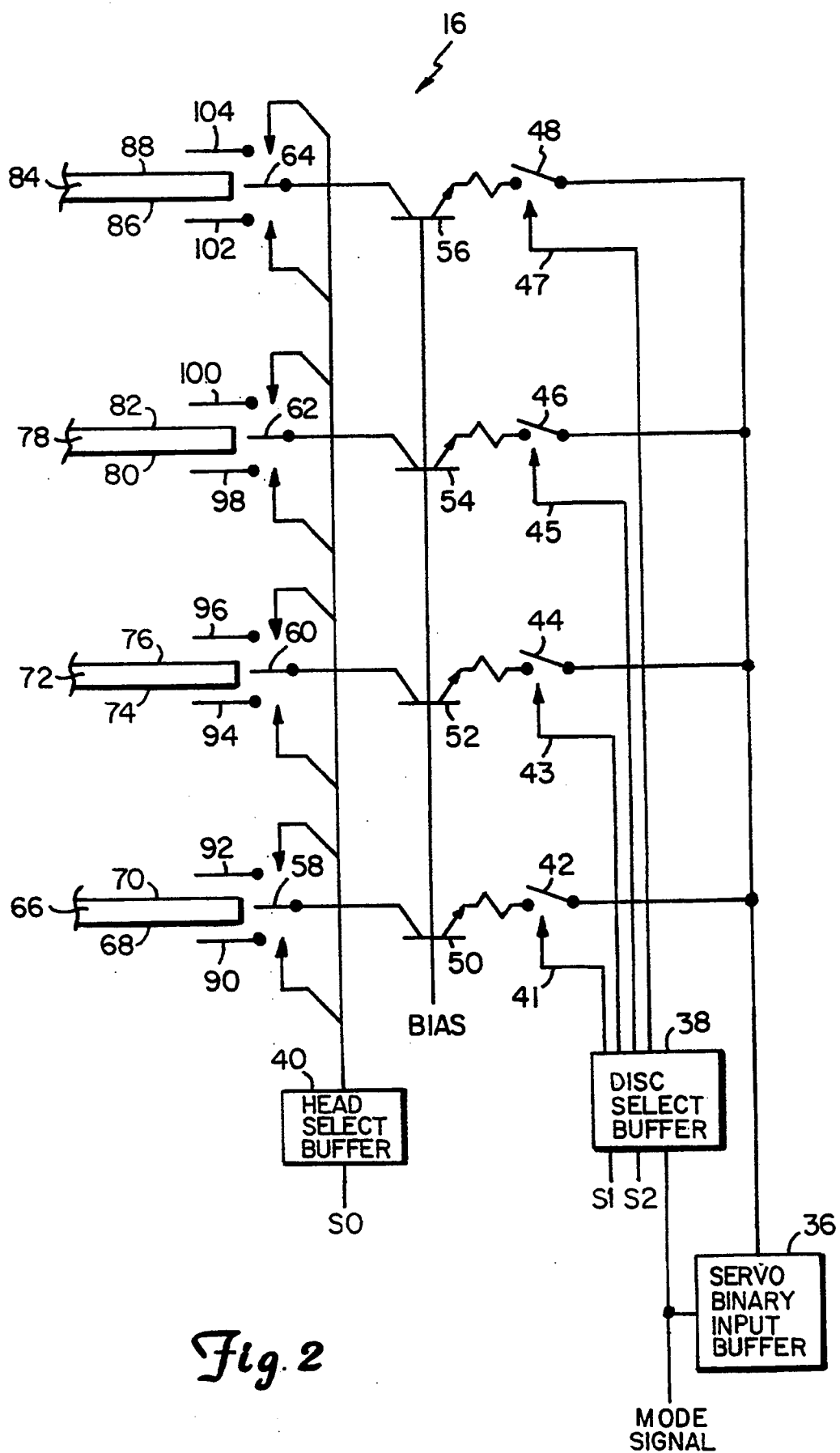
FIG. 2 is a circuit diagram of a portion of the write circuitry of the read/write preamplifier shown in FIG. 1.

FIG. 2 is a circuit diagram of a portion of the write circuitry of read/write preamplifier 16 shown in FIG. 1. The system shown in FIG. 2 includes servo binary input buffer 36, disc select buffer 38, head select buffer 40, control signals 41, 43, 45, and 47, switches 42, 44, 46, 48, 58, 60, 62, and 64, transistors 50, 52, 54, and 56, first magnetic disc 66 having disc surfaces 68 and 70, second magnetic disc 72 having disc surfaces 74 and 76, third magnetic disc 78 having disc surfaces 80 and 82, fourth magnetic disc 84 having disc surfaces 86 and 88, and disc heads 90, 92, 94, 96, 98, 100, 102, and 104.

The mode signal enters preamplifier 16 through servo binary input buffer 36 and disc select buffer 38. The mode signal determines whether preamplifier 16 is either in a data write mode or a servo write mode. In a data write mode, the write current exiting servo binary input buffer 36 is supplied to the emitter of one of the set of transistors 50, 52, 54 and 56 as determined by second and third binary input signals S1 and S2, the set of control signals 41, 43, 45, and 47, and switches 42, 44, 46, and 48. In contrast, in a servo write mode, the digital logic of second and third binary input signals S1 and S2 supply the write current transmitted through servo binary input buffer 36 to the emitters of all four transistors 50, 52, 54, and 56. In addition, in the servo write mode, control signals 41, 43, 45, and 47 are all activated.

In a servo write mode, all four control signals 41, 43, 45, and 47 leading towards switches 42, 44, 46, and 48 are active. Therefore, switches 42, 44, 46, and 48 are closed and the write current flows into the emitters of transistors 50, 52, 54, and 56, respectively. The bases of transistors 50, 52, 54, and 56 are properly biased so that when there is an emitter current to a particular transistor, that transistor will produce a corresponding collector current.

The collector current of transistors 50, 52, 54, and 56 are supplied to switches 58, 60, 62, and 64, respectively. Head select buffer 40 interprets first binary input signal S0, which is the least significant bit of the digital logic binary input signal, to determine whether the collector current, representing the write current, in switches 58, 60, 62, and 64 are supplied either to heads 90, 94, 98, and 102 or to heads 92, 96, 100, and 104, respectively. Therefore, in the servo write mode, one half of the available heads supply a write signal based upon the write current to one half of the available disc surfaces at one time. Thus, the process of writing a write signal representing servo information to a plurality of disc surfaces is significantly shortened and the possibility of destroying internal components of read/write preamplifier 16, or in particular of disc heads 90–104 due to the dissipation of too much power is eliminated.

In a data write mode, the mode signal communicates with servo binary input buffer 36 which activates the write current to switches 42, 44, 46, and 48. The mode signal also communicates with disc select buffer 38. Disc select buffer 38 interprets second and third binary input signals S1 and S2 to determine which particular write current will be activated. In this mode, only one of the four currents will be activated. Thus, current is supplied to only one switch from the set of switches 58, 60, 62, and 64. The base of the chosen transistor is properly biased so that when there is an emitter current to a particular transistor, that transistor will produce a corresponding collector current. Therefore, only one transistor from the set of transistors 50, 52, 54, and 56 produces a collector current.

The collector current from the chosen activated transistor, representing the write current, is supplied to either switch 58, 60, 62, or 64. Similar to the servo write mode, head select buffer 40 interprets first binary input signal S0, to determine which disc surface of a particular disc information will be written to. Therefore, in the data write mode, only one disc surface of one disc is written to at any particular time.

For example, if we have chosen to write data to disc surface 74 of magnetic disc 72, the write current flowing to switches 42, 44, 46, and 48 would be activated via servo binary input buffer 36. Disc select buffer 38 interprets second and third binary input signals S1 and S2 and activates control signal 43, thereby closing switch 44 and supplying the write current to the emitter of transistor 52. The base of transistor 52 would be properly biased to produce a corresponding collector current, which is supplied to switch 60. Head select buffer 40 interprets first binary input signal S0 and directs the current to head 94, which writes the desired write signal based upon the write current to disc surface 74 of disc 72.

FIG. 3 is a detailed circuit diagram further illustrating the portion of the write circuitry of read/write preamplifier 16 shown in FIG. 2. In the case where an element in FIG. 3 is similar to and has a similar purpose as an element in FIG. 2, the same description identification number has been used. As shown in FIG. 3, preamplifier 16 includes servo binary input buffer 36, disc select buffer 38, head select buffer 40, transistors Q1–Q16, first magnetic disc 66 having disc surfaces 68 and 70, second magnetic disc 72 having disc surfaces 74 and 76, third magnetic disc 78 having disc surfaces 80 and 82, fourth magnetic disc 84 having disc surfaces 86 and 88, and disc heads 90, 92, 94, 96, 98, 100, 102, and 104. The circuit shown in FIG. 3 is similar to the circuit shown in FIG. 2; however, switches 42, 44, 46, 48, 58, 60, 62, and 64 have been replaced by transistors Q1–Q16.

A mode signal enters preamplifier 16 through servo binary input buffer 36 and disc select buffer 38. The mode signal determines whether preamplifier 16 is either in a data write mode or a servo write mode. In a data write mode, disc select buffer 38 interprets the digital logic of second and third binary input signals S1 and S2 to determine which transistor from the set of transistors Q1, Q5, Q9, and Q13 will have its base current activated. In contrast, in a servo write mode, the digital logic of second and third binary input signals S1 and S2 are overridden by the mode signal transmitted through servo binary input buffer 36. Thus, in the servo write mode, transistors Q1, Q5, Q9, and Q13 will not have active emitter currents, but transistors Q3, Q7, Q11, and Q15 will have active emitter currents. The bases of these transistors are properly biased by $V_{ref}$ so that when there is an emitter current to a particular transistor, that transistor will produce a corresponding collector current.

In a servo write mode, transistor Q3, Q7, Q11, and Q15 have active emitter currents. The bases of transistors Q3, Q7, Q11, Q15 are properly biased by reference voltage $V_{ref}$ to produce a collector current when there is an emitter current.

The collector current of transistors Q3, Q7, Q11, and Q15 are supplied to the emitters of transistor pairs Q2 and Q4, Q6 and Q8, Q10 and Q12, and Q14 and Q16, respectively. Head select buffer 40 interprets first binary input signal S0, which is the least significant bit of the digital logic binary input signal, to determine whether the base current of transistors Q2, Q6, Q10, and Q14 are properly biased or whether the base current of transistors Q4, Q8, Q12, and Q16 are probably biased. The plurality of transistors which are properly biased transmit a collector current representative of a write signal. The corresponding disc heads will write servo information to the corresponding disc surfaces. Therefore, in the servo write mode, one half of the available disc surfaces are written to at one time. Thus, the process of writing servo information to a plurality of disc surfaces is significantly shortened. In the present circuit, the time it takes to write servo information to magnetic discs 66, 72, 78, and 84 is shortened by a factor of four. In addition, the possibility of destroying internal components of read/write preamplifier 16 or in particular of disc heads 90–104 due to the dissipation of too much power during a servo write mode is eliminated.

In a data write mode, the mode signal communicates with servo binary input buffer 36 and provides an emitter current to transistors Q1, Q5, Q9, and Q13. In addition, the mode signal communicates with disc select buffer 38 and does not provide an emitter current to transistors Q3, Q7, Q11, and Q15. Disc select buffer 38 interprets second and third binary input signals S1 and S2 to determine which transistor from the set of transistors Q1, Q5, Q9, and Q13 has a proper base current to bias the transistor. In this mode, only one current will be activated. Therefore, only one transistor from the set of transistors Q1, Q5, Q9, and Q13 is activated and current is supplied to the collector of only one transistor. The collector current from the selected transistor is supplied to the corresponding emitters of two transistors from the set of transistors Q2, Q4, Q6, Q8, Q10, Q12, Q14, and Q16. Similar to the servo write mode, head select buffer 40 interprets first binary input signal S0 to determine which disc surface of the particular disc information will be written to. Therefore, in the data write mode, only one disc surface of one disc is written to at any particular time.

For example, if we have chosen to write data to disc surface 82 of magnetic disc 78, the emitter currents of transistors Q3, Q7, Q11, and Q15 would not be activated via servo binary input buffer 36. Rather, the emitter currents of Q1, Q5, Q9, and Q13 would be activated by servo binary input buffer 36 interpreting the mode signal. Disc select buffer 38 interprets second and third binary input signals S1 and S2 and activates the base current of transistor Q9. Thus, transistor Q9 would be properly biased to produce a collector current. The collector current of Q9 would be supplied as emitter current to the emitters of Q10 and Q12. Head select buffer 40 interprets first binary input signal S0 and activates the base current of transistors Q4, Q8, Q12, and Q16. However, since transistor Q12 is the only transistor having both an emitter current and a base current, transistor Q12 is the only transistor to produce a collector current. This collector current is directed to head 100 which writes the desired data to disc surface 82 of disc 78.

Although the present invention has been described with reference to preferred embodiments, workers skilled in the art will recognize that changes may be made in form and detail without departing from the spirit and scope of the invention. For example, workers skilled in the art will recognize that the preamplifier configuration of the present invention can be utilized for any number of discs by either increasing or decreasing the binary input signal, the number of switches or transistors, and the number of discs.

What is claimed is:

1. A system for writing servo information to a plurality of magnetic discs in a servo write mode, and for writing data to the plurality of magnetic discs in a data write mode, the system comprising:

a plurality of write heads for receiving a write current and for applying a write signal based upon the write current to the plurality of magnetic discs, the write signal representing servo information in the servo write mode and representing data in the data write mode;

first direction means for receiving a mode signal and for directing the write current based upon the mode signal;

second direction means, coupled to the first direction means, for receiving a binary input signal and for directing the write current to a selected portion of the plurality of write heads based upon the binary input signal; and third direction means, coupled to the second direction means and coupled to the plurality of write heads, for receiving the binary input signal and for supplying the write current to one write head in the selected portion of the plurality of write heads during the data write mode, and for supplying the write current to one half of the write heads in the selected portion of the plurality of write heads during the servo write mode.

2. The system of claim 1 wherein the first direction means comprises a servo binary input buffer.

3. The system of claim 1 wherein the third direction means comprises:

a first plurality of switches coupled to a first binary input signal and coupled to the plurality of write heads.

4. The system of claim 3 wherein the second direction means comprises:
   a second plurality of switches coupled to the first plurality of switches and coupled to the first direction means.

5. The system of claim 4 wherein the third direction means further comprises:
   a first switch coupled to the first binary input signal, wherein the first switch directs the write current between a first write head and a second write head; and
   a second switch coupled to the first binary input signal, wherein the second switch directs the write current between a third write head and a fourth write head.

6. The system of claim 5 wherein the second direction means further comprises:
   a third switch coupled to a second binary input signal, wherein the third switch directs the write current to the first switch; and
   a fourth switch coupled to the second binary input signal, wherein the fourth switch directs the write current to the second switch.

7. The system of claim 6 wherein the third direction means further comprises:
   a fifth switch coupled to the first binary input signal, wherein the fifth switch directs the write current between a fifth write head and a sixth write head; and
   a sixth switch coupled to the first binary input signal, wherein the sixth switch directs the write current between a seventh write head and an eighth write head.

8. The system of claim 7 wherein the second direction means further comprises:
   a seventh switch coupled to the second binary input signal and a third binary input signal, wherein the seventh switch directs the write current to a third switch; and
   an eighth switch coupled to the second and third binary input signal, wherein the eighth switch directs the write current to the fourth switch.

9. The system of claim 4 wherein each of the plurality of switches includes at least one transistor.

10. A method for writing servo information to a plurality of magnetic discs in a servo write mode, and for writing data to the plurality of magnetic discs in a data write mode, the method comprising:
    receiving a mode signal representative of a mode in which a disc drive system is operating;
    directing a write current based upon the mode signal;
    coupling the write current to a selected portion of a plurality of write heads based upon a binary input signal;
    supplying the write current to one write head in the selected portion of the plurality of write heads during the data write mode, and to one half of the write heads in the selected portion of the plurality of write heads during the servo write mode, based upon the binary input signal; and
    writing a write signal from one write head to one magnetic disc during the data write mode, and from the plurality of write heads to a plurality magnetic discs during the servo write mode, the write signal representing servo information in the servo write mode and representing data in the data write mode.

11. The method of claim 10 wherein receiving a mode signal further comprises receiving a servo binary input signal representative of mode signal.

12. The method of claim 10 wherein directing a write current further comprises coupling the write current to a plurality of switches.

13. The method of claim 12 wherein directing a write current further comprises coupling the plurality of switches to the plurality of write heads.

14. The method of claim 13 wherein each of the plurality of switches includes at least one transistor.

15. A system for writing servo information to a plurality of magnetic discs in a servo write mode, and for writing data to the plurality of magnetic discs in a data write mode, the system comprising:
    a plurality of write heads for receiving a write current and for applying a write signal based upon the write current to the plurality of magnetic discs, the write signal representing servo information in the servo write mode and representing data in the data write mode;
    a servo binary input buffer for receiving a mode signal and for directing the write current based upon the mode signal;
    a disc select buffer for receiving a binary input signal and for selecting a first selected portion of write heads;
    a first plurality of switches, coupled to the servo binary input buffer and coupled to the disc select buffer, for directing the write current to the first selected portion of write heads;
    a head select buffer for receiving the binary input signal and for selecting a second selected portion of write heads, wherein the second selected portion of write heads is one half of the first selected portion of write heads; and
    a second plurality of switches, coupled to the first plurality of switch, to the head select buffer, and to the plurality of write heads, for supplying the write current to the second selected portion of write heads.

16. The system of claim 15 wherein each of the plurality of switches includes at least one transistor.

* * * * *

UNITED STATES PATENT AND TRADEMARK OFFICE
CERTIFICATE OF CORRECTION

PATENT NO. : 5,373,402

DATED : December 13, 1994

INVENTOR(S) : JOHN J. PRICE, JR., TUAN V. NGO

It is certified that error appears in the above-indentified patent and that said Letters Patent is hereby corrected as shown below:

Col. 2, line 34, after "buffer" (second occurrence), insert a --,--

Col. 8, line 9, after "plurality"(second occurrence), insert --of--

Col. 8, line 16, after "of", insert --the--

Signed and Sealed this

Twenty-first Day of March, 1995

Attest:

BRUCE LEHMAN

Attesting Officer  Commissioner of Patents and Trademarks